(12) United States Patent
Machihara et al.

(10) Patent No.: US 6,233,578 B1
(45) Date of Patent: May 15, 2001

(54) METHOD AND SYSTEM FOR INFORMATION RETRIEVAL

(75) Inventors: Hiroki Machihara; Gengo Suzuki, both of Yokohama; Eiji Okada, Akashi; Naoya Kanou, Yokosuka, all of (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 08/927,629

(22) Filed: Sep. 11, 1997

(30) Foreign Application Priority Data

Sep. 11, 1996 (JP) .................................................... 8-240857

(51) Int. Cl.[7] ...................................................... G06F 17/30
(52) U.S. Cl. .................................................. 707/10; 707/3
(58) Field of Search ....................................... 707/1, 3, 10

(56) References Cited

U.S. PATENT DOCUMENTS

| | | | |
|---|---|---|---|
| 4,769,772 | 9/1988 | Dwyer | 707/2 |
| 5,345,586 | * 9/1994 | Hamala et al. | 707/10 |

(List continued on next page.)

FOREIGN PATENT DOCUMENTS

| | | | |
|---|---|---|---|
| 0 625 756 A1 | 11/1994 | (EP) . | |
| 02-144617 | 6/1990 | (JP) | G06F/15/40 |
| 06-131399 | 5/1994 | (JP) | G06F/15/40 |

(List continued on next page.)

OTHER PUBLICATIONS

Templeton, M. "InterViso: A Data Integration Server" Proc. of the 3rd Internat. conf. on Parallel and Distributed Information Systems Sep. 1994, pp. 265–266.*

Templeton et al., "Mermaid—A Front–End to Distributed Heterogeneous Databases," Proceedings of the IEEE, New York, NY, US, vol. 75, No. 5, May 1987, pp. 695–708.

Dwyer et al., "Some Experiences with a Distributed Database Testbed System," Proceedings of the IEEE, vol. 75, No. 55, May 1987, pp. 633–648.

JP 07 064893, Mar. 10, 1995, Patent Abstracts of Japan.

Kawano et al., Integrated Utilization of Heterogeneous Database Systems Through a Data Network, Mapping New Applications onto New Technologies, Zurich, Mar. 8–10, 1988.

S. Ichiyama et al., "Natural Language Interface Kit: IF–Kit", NEC Technical Journal, vol. 47, No. 8, pp. 53–58.

*Primary Examiner*—Jack M. Choules
(74) *Attorney, Agent, or Firm*—Pennie & Edmonds LLP

(57) ABSTRACT

The method and system for retrieving information allow the user to retrieve desired information from database systems by simply specifying retrieval content and retrieval conditions using languages familiar to the user, without having to know the names for the relevant database systems or their structures or without having to interact with the platform of the meta-information, i.e., information concerning the use of database systems and accessing method. The present method allows retrieval of information from different database systems connected to a communication network, by using reference information stored beforehand to access different database systems; consulting the reference information to determine database systems which contains data to satisfy the information retrieval request by converting requested items to equivalent related words that the system can recognize. The storage locations of the data and instructions on how to acquire the data are determined using relational items to link various tables so that an information retrieval statement can be prepared by the system program on user's behalf. The databases are searched according to the acquiring method and the information retrieval content described in the system prepared statement, and the retrieved information is presented for viewing in a format that is used by the information searcher.

11 Claims, 12 Drawing Sheets

U.S. PATENT DOCUMENTS

| | | | | |
|---|---|---|---|---|
| 5,506,984 | * | 4/1996 | Miller | 707/10 |
| 5,519,875 | | 5/1996 | Yokohama et al. | 709/303 |
| 5,778,350 | * | 7/1998 | Adems et al. | 707/1 |
| 5,826,257 | * | 10/1998 | Snelling, Jr. | 707/4 |

FOREIGN PATENT DOCUMENTS

| | | | |
|---|---|---|---|
| 07-296084 | 11/1995 | (JP) | G06F/19/00 |
| 08-221436 | 8/1996 | (JP) | G06F/17/30 |
| 09-212517 | 8/1997 | (JP) | G06F/17/30 |

* cited by examiner

| NAME | DATA_ITEM_NAME |
|---|---|
|  |  |

170d

| COLUMN_NAME | GROUP | COLUMN_NO | TABLE_NAME |
|---|---|---|---|
|  |  |  |  |

170b

| DB_NAME | HOST_NAME | DBMS_NAME |
|---|---|---|
|  |  |  |

170e

| DBMS | QUOTATION_MARKS |
|---|---|
|  |  |

170c

| TABLE_NAME | DB_NAME |
|---|---|
|  |  |

170f

| DISPLAY_FORMAT | HEADER | DELIMITER |
|---|---|---|
|  |  |  |

FIG.5

| RETRIEVAL_CONTENT | RETRIEVAL_CONDITIONS | DISPLAY_FORMAT |
|---|---|---|
|  |  |  |

FIG.7

| NAME | DATA_ITEM_NAME |
|---|---|
| WRESTLER NAME | WRESTLER NAME |
| WRESTLER NAME | SUMO-WRESTLER NAME |
| WRESTLER NAME | EARNED SUMO NAME |
| WRESTLER NAME | EARNED RANKING |
| NATIVE OF | FROM |
| NATIVE OF | BORN IN CITY, DISTRICT, PREFECTURE |
| NATIVE OF | BORN IN PREFECTURE |
| NATIVE OF | BORN IN |

170a

170b

| DB_NAME | HOST_NAME | DBMS_NAME |
|---|---|---|
| SUMO-WRESTLER FILES | DATAPRO | ORACLE7 |
| PERSONNEL | DARIX1 | INFORMIX |

170c

| TABLE_NAME | DB_NAME |
|---|---|
| WRESTLER | SUMO-WRESTLER FILES |
| BOSS | SUMO-WRESTLER FILES |
| STAFF | PERSONNEL |

| COLUMN_NAME | GROUP | COLUMN_NO. | TABLE_NAME |
|---|---|---|---|
| BOSS NAME | CHAR | 40 | BOSS |
| BOSS ADDRESS | CHAR | 35 | BOSS |
| BOSS TEL NO. | CHAR | 10 | BOSS |
| BOSS ID | CHAR | 5 | BOSS |
| BOSS ID | CHAR | 5 | WRESTLER |
| WRESTLER NAME | CHAR | 30 | WRESTLER |
| AGE | INT | — | WRESTLER |
| BIRTH DATE | INT | 8 | WRESTLER |
| BORN IN PREF. | CHAR | 20 | WRESTLER |
| BLOOD TYPE | CHAR | 2 | WRESTLER |
| STAFF ID | CHAR | 8 | STAFF |
| STAFF DATE | CHAR | 6 | STAFF |

170d

170e

| DBMS | QUOTATION_MARKS |
|---|---|
| ORACLE7 | " |
| INFORMIX | ' |

170f

| DISPLAY_FORMAT | HEADER | DELIMITER |
|---|---|---|
| SPREADSHEET A | CONTENT-TYPE:TEXT/EXCEL | TAB |

FIG.8

| RETRIEVAL_CONTENT | RETRIEVAL_CONDITIONS | DISPLAY_FORMAT |
|---|---|---|
| WRESTLER | NATIVE OF=TOKYO | SPREADSHEET A |

FIG.9

BOSS TABLE

| BOSS_ID | BOSS_NAME | BOSS_ADDRESS | BOSS_TEL_NO. |
|---|---|---|---|
| 101 | FUTAGOYAMA | TOKYO | 3413 |
| 205 | TAKASAGO | WAKAYAMA | 5131 |

WRESTLER TABLE

| WRESTLER_NAME | AGE | BIRTH_DATE | BORN_IN_FREF. | BLOOD_TYPE | BOSS_ID |
|---|---|---|---|---|---|
| TAKANOHANA | 25 | 12.10 | TOKYO | A | 101 |
| KOTONISHIKI | 30 | 7.7 | HOKKAIDO | B | 311 |

FIG.10

DB1(SUMO-WRESTLER FILES):SELECT *WRESTLER NAME* FROM *WRESTLER* WHERE BORN IN PREFECTURE= "TOKYO"

FIG.11

```
MIME-VERSION:1.0

CONTENT-TYPE:TEXT/EXCEL

TAKANOHANA
```

METHOD AND SYSTEM FOR INFORMATION RETRIEVAL

BACKGROUND OF THE INVENTION

1. Field of the Invention

The present invention relates in general to methods and systems for retrieving information, and relates in particular to a method for retrieving information, specified by an information searcher, from a plurality of different database systems which are connected to a communication network.

2. Description of the Related Art

Searching and retrieving information in a database system is carried out by first specifying a target database residing in certain meta-information (known as metadata or schema information, i.e., information on the use of the database and preparing a structured query language (SQL) for) to describe what table to be searched, under what search conditions and what type of information to be retrieved.

When searching for information in a number of databases connected to a communication network, there are search systems that give an impression that the search is being carried out within one database, by having the database manager integrate all the separate sections of meta-information from applicable databases so that there is no need for the information searcher (user) to be aware of the existence of separate databases or their retrieval methods to carry out searches through different databases.

When communicating with databases distributed over several database systems, there are also known methods to work with a structure of the meta-information which is common to all the database systems, so that the user's request is executed by generating a common request to all such systems, and the search results are displayed in a summary table; or when the content of the retrieval information has been decided or when the structure and format of the specified information are given in the retrieval conditions, the specified search content can be analyzed and the target database systems can be selected to lead to the execution of specific search commands.

However, integrated meta-information managed by such conventional multi-databased systems connected to a number of databases are strictly dependent on the data managed by some database management system (DBMS) and are available as an interface to particular sets of data. In using such a retrieval system, the user must be cognizant of the type of data stored, their structures and the format.

Furthermore, there is no assurance that the information available through general meta-information platforms are grouped after interpreting the meaning of the stored data, because data are often selected on the basis of ease of programming or to maintain some consistency in database tables. This situation presents a problem because it is difficult for the user to anticipate the type of information actually being stored unless the user, searching through databases connected to a network, is relatively familiar with the contents of information described in the meta-information.

Further, when searches are conducted through a plurality of distributed database systems, it is necessary that the different meta-information be built on an identical structure, for the retrieval to be successful. Additionally, when working in such a distributed information system, it must be remembered that the system manager is only capable of searching for a set of request items or words recognizable by the DBMS and search results are then reported to correspond to the common items. Therefore, it is difficult for the system manager to respond to individualized request items of the user. Although the user can specify certain database systems to be searched with specific search commands, when the structures and formats of the required information are specified in search content or in search conditions, this is possible only if all the database systems of interest share strictly identical structures, because the existing search methodologies do not permit the user to retrieve information from database systems having different structures.

Therefore, using the conventional information retrieval systems based on present meta-information or schema information offered by an integrally managed platform, the user is required first to interact with an integrated platform of meta-information provided by some DBMS, and then to enter search commands directly applicable to relevant database structures. As the number of database systems connected to a network increases in the future, it becomes increasingly difficult for the user to first understand the contents of the large number of database systems, and then to describe search commands and specify necessary conditions to obtain desired information.

With further advancement anticipated in the communications network, there is a growing desire to connect various database systems to the network so as to more effectively utilize data stored in various database systems. However, even if a technical environment is created so that a large number of databases become accessible in the network, the user still faces a situation of vast amounts of information exceeding his ability to develop proper understanding of the potential information available, resulting in difficulties in retrieving desired information from a widely distributed databases.

SUMMARY OF THE INVENTION

It is an object of the present invention to provide an information retrieval system to enable an information searcher or user to carry out a thorough and effective retrieval from a plurality of different databases managed by different management systems, without having to interact with integrally managed meta-information, schema information or to specify technical requirements for the operation of different database systems, such as the locations and structures of the plurality of databases.

The object has been achieved in a method for retrieving requested information, comprising the steps of: storing reference information beforehand to access a plurality of database systems; consulting the reference information upon receiving the information retrieval request; determining a database system which contains data to satisfy the information retrieval request as well as a storage location of the data, and obtaining instructions relating to an acquiring method for retrieving data from the database system; preparing an information retrieval statement in conformity with the storage location and the acquiring method; searching through the database system for requested information according to the information retrieval statement and the acquiring method; and presenting retrieved information to an information searcher.

Accordingly, the present method of retrieving information allows the user to retrieve desired information from a plurality of different storage locations and database systems, by simply specifying retrieval content and retrieval conditions using words that are familiar to the user, without the need for the user to interact with the integrated meta-information platform which manages different database systems or to know the names for databases or the structures of different databases.

Also, the method is most preferably practiced by using an information retrieval system having a communication network, a plurality of different database systems connected to the communication network, and retrieval means for retrieving information in response to an information retrieval request entered by an information searcher, and comprising: reference information storage means for storing access requirements for accessing the plurality of different database systems; storage location information retrieval means for retrieving information, concerning database locations, database structures and database format to satisfy the information retrieval request, from the reference information storage means; method retrieval means for obtaining instructions relating to acquiring methods for retrieving information specified in the information retrieval request from the database systems which contain information specified in the information retrieval request; and information retrieval means for determining relevant database systems according to information obtained from the storage location information retrieval means, and, in conformity with the acquiring method, for retrieving information specified in an information retrieval content included in the information retrieval request.

Accordingly, the present information retrieval system allows the user to retrieve desired information from a plurality of storage locations and database systems by simply specifying retrieval content and retrieval conditions using words familiar to the user, without having to know the names for the relevant databases or their system structures or to interact with the meta-information platform.

The above method and the information retrieval system presented above are further enhanced by using a recording medium, readable by computer means, having pre-recorded information resource dictionary data; wherein, the information resource dictionary data are recorded in: a column information file for managing columns of requested items specified in tables; a table information file for managing tables contained in each database; a database information file for managing locations of each database; and a database management system file, known as a DBMS file, for managing dedicated information for methods of acquiring requested items from each database; and wherein the column information file has an allocation for recording column names contained in tables in relation to table titles so as to relate column names to requested items specified in the information retrieval request; the table information file has an allocation for recording table titles contained in databases in relation to database titles so as to relate the column information file to the table information file through table titles; the database information file has an allocation, for each of databases connected to the communication network, for recording database titles, host names indicating locations of databases and DBMS names for each database being managed by a DBMS, so as to relate the table information file and the database information file through database titles; and the dedicated DBMS file has an allocation, for each of DBMSs, for recording DBMS names in relation to dedicated information for each DBMS, so as to relate the database information file and the dedicated DBMS file through database titles.

Accordingly, the recording medium having the information resource dictionary data allows the user to specify retrieval conditions and retrieval content using words that are familiar to the user, because the dictionary is utilized to convert the requested items entered by the user to related data items used by different databases and database systems so as to retrieve requested information from a plurality of storage locations and different database systems, according to the retrieval content and retrieval conditions specified by the user, without having the user to specify the names for databases or their structures.

The retrieving method, the retrieving system working in conjunction with the information resource dictionary data to assist effective information retrieval are all enabled by a recording medium, having a computer-executable program, comprising: reference information storage means for storing access requirements for accessing the plurality of different databases; storage location information retrieval means for retrieving stored information in databases, which store data to satisfy the information retrieval request, from the reference information storage means; method retrieval means for obtaining instructions relating to acquiring methods for retrieving data to satisfy the information retrieval request from the reference information storage means; and information retrieval means for determining relevant databases according to information obtained by the storage location information retrieval means, and retrieving information to satisfy the information retrieval request in conformity with the acquiring method obtained by the method retrieval means.

Accordingly, the recording medium having the comprehensive information retrieval program allows the user to retrieve desired information from a plurality of storage locations and database systems by simply specifying retrieval content and retrieval conditions using words familiar to the user, without having to know the names for the relevant databases or their structures or without having to interact with the meta-information platform.

In overall summary, it is clear that the present method and system of information retrieval, together with the essential tools of information resource dictionary and enabling operational program, represent a significant contribution to the needs of the coming information society by allowing desired information to be retrieved simply, effectively and comprehensively from databases in any database systems connected to a communication network.

BRIEF DESCRIPTION OF THE DRAWINGS

FIG. 4 is a representation of the structure of information resource dictionary.

FIG. 5 is a representation of the information retrieval request from a user.

FIG. 7 is an example of the information resource dictionary in an embodiment of the information retrieval methodology.

FIG. 8 is an example of the information retrieval request in an embodiment.

FIG. 9 is an example of the table stored in the database in an embodiment.

FIG. 10 is an example of the information retrieval statement (SQL) in an embodiment.

FIG. 11 is an example of retrieved results for display in a spreadsheet A format in an embodiment.

DESCRIPTION OF THE PREFERRED EMBODIMENTS

First, the principle of the methodology and the system configuration for enabling the methodology will be explained with reference to FIGS. 1 and 2.

The methodology is described in terms of items to represent different types of data which are handled by the retrieval system: "data items" refer to general data which may be stored in any database; "request items or requested items" represent data being sought by the user; "related data items" represent data which are similar to the "requested items"; and "relation items" represent data which link one table to other table(s) through a relation item, i.e. some common data item(s) found in those tables.

Figure 1:
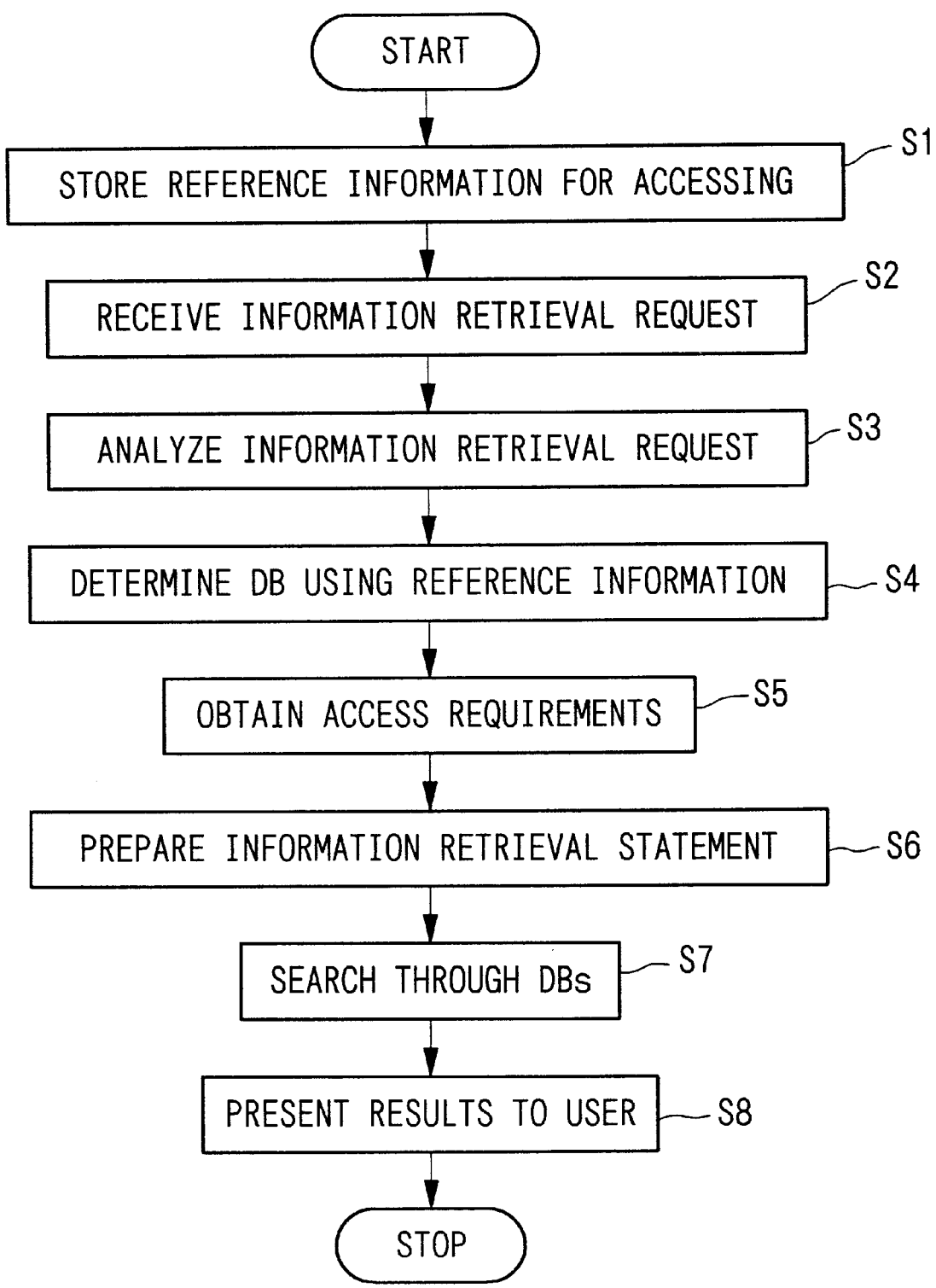
FIG. 1 is a schematic illustration of the principle of the information retrieval methodology of the present invention.

FIG. 1 shows the principle of the methodology in a conceptual block diagram.

The present invention relates to a method of information retrieval from a plurality of different databases which are connected to a communication network (com-network) by generating an information retrieval request and retrieving information corresponding to the request. A series of sequential steps in the method are presented below.

Storing reference information to enable accessing a plurality of database systems (step 1);

Receiving an information retrieval request (step 2);

Analyzing the information retrieval request (step 3);

Determining relevant database systems which would contain the requested data in consultation with reference information (step 4);

Determining how to acquire the requested data (step 5);

Preparing an information retrieval statement according to acquired information on storage locations and accessing methods for the database systems which would contain the data specified in the information retrieval request (step 6);

Retrieving information from relevant database systems satisfying the information retrieval request (step 7);

Presenting the user with the retrieved information (step 8).

An aspect of this method is that the retrieved information can be presented to the user in a format conforming to the application software used by the user so as to facilitate reading of the retrieved information by the user.

Figure 2:
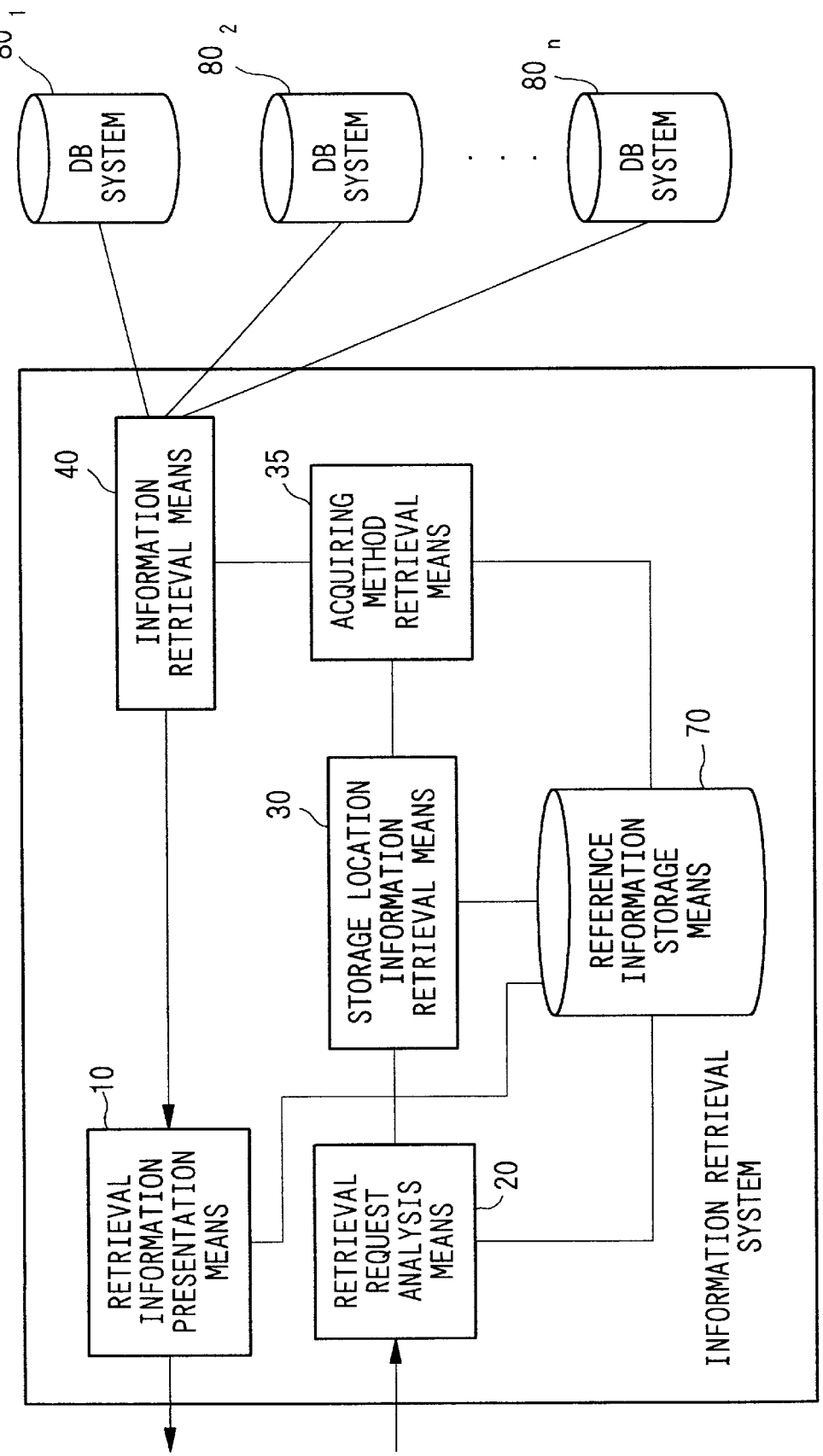
FIG. 2 is a schematic representation of the principle to enable the retrieval methodology.

FIG. 2 shows an example of a system configuration to enable the principle of the methodology to be practiced.

The present information retrieval system is designed to operate in an environment comprised of: a communication network; a plurality of database systems connected to the communication network; and information retrieval means for receiving an information retrieval request from a user and for retrieving information from the relevant database systems according to the information retrieval request. The information retrieval system includes components as follows:

reference information storage means 70 for storing information concerning location information for data stored in a plurality of different database systems $80_1$-$80_n$, and information on accessing methods for retrieving the stored data;

request analysis means 20 for analyzing the information retrieval request input by the information searcher;

storage location information retrieval means 30 for acquiring, from the reference information storage means 70, information concerning the locations of the database systems which store the data to satisfy the analyzed request;

method retrieval means 35 having a procedure to obtain acquiring methods for retrieving data to correspond to the analyzed request, from the relevant database systems, by consulting the reference information storage means 70, and a procedure to select optimum table groups from a combination of related data items selected by the request analysis means 20; and information retrieval means 40 for specifying relevant database systems to be searched according to information obtained from the storage location retrieval means 30, and for retrieving obtained information according to acquiring methods obtained by the method retrieval means 35.

The present information retrieval system is further provided with retrieved data presentation means 10 for transforming information corresponding to the information retrieval request obtained by information retrieval means 40, into a format which can be read by an application software used by the information searcher so as to facilitate processing of the acquired information by the user.

The request analysis means 20 also includes item conversion means for converting the requested items in the information retrieval request into related data item names described in the database systems.

The storage location retrieval means 30 includes a procedure for selecting an optimum table grouping from a combination of names for the related data items produced from the results of analysis performed by the request analysis means 20.

In the conventional systems, a user (information searcher) must directly specify items of interest in a meta-information platform, therefore, it is necessary for the user to be aware of the system contents, i.e., the types of database systems connected to the com-network(communication network), and the types of tables contained in the different database systems. In contrast, in the present retrieval system, the retrieval conditions specified by the user and the requested items expressed in the retrieval content are analyzed so that user's words (names for requested items) familiar to the user are converted into system words (names for related data items) that can be recognized by the relevant database systems.

Further, by knowing where the information is located, it is possible to select optimum table grouping by combining the related data items, to prepare an information retrieval statement (SQL), to execute the SQL, to convert the retrieved results into a format suitable for reading in the user's environment. Therefore, it becomes possible to process a retrieval request from a user who does not have system knowledge, such as the locations and structures of database systems, by enabling the retrieval system to prepare a SQL to actually acquire the information on user's behalf, thereby achieving an objective of the present invention that desired information can be obtained, without requiring the user to know the locations and structures of different database systems connected to a com-network or the method of acquiring the information in a particular meta-information platform.

Next, the structure and operation of the information retrieval system of the present invention will be presented with reference to the drawings.

Figure 3:
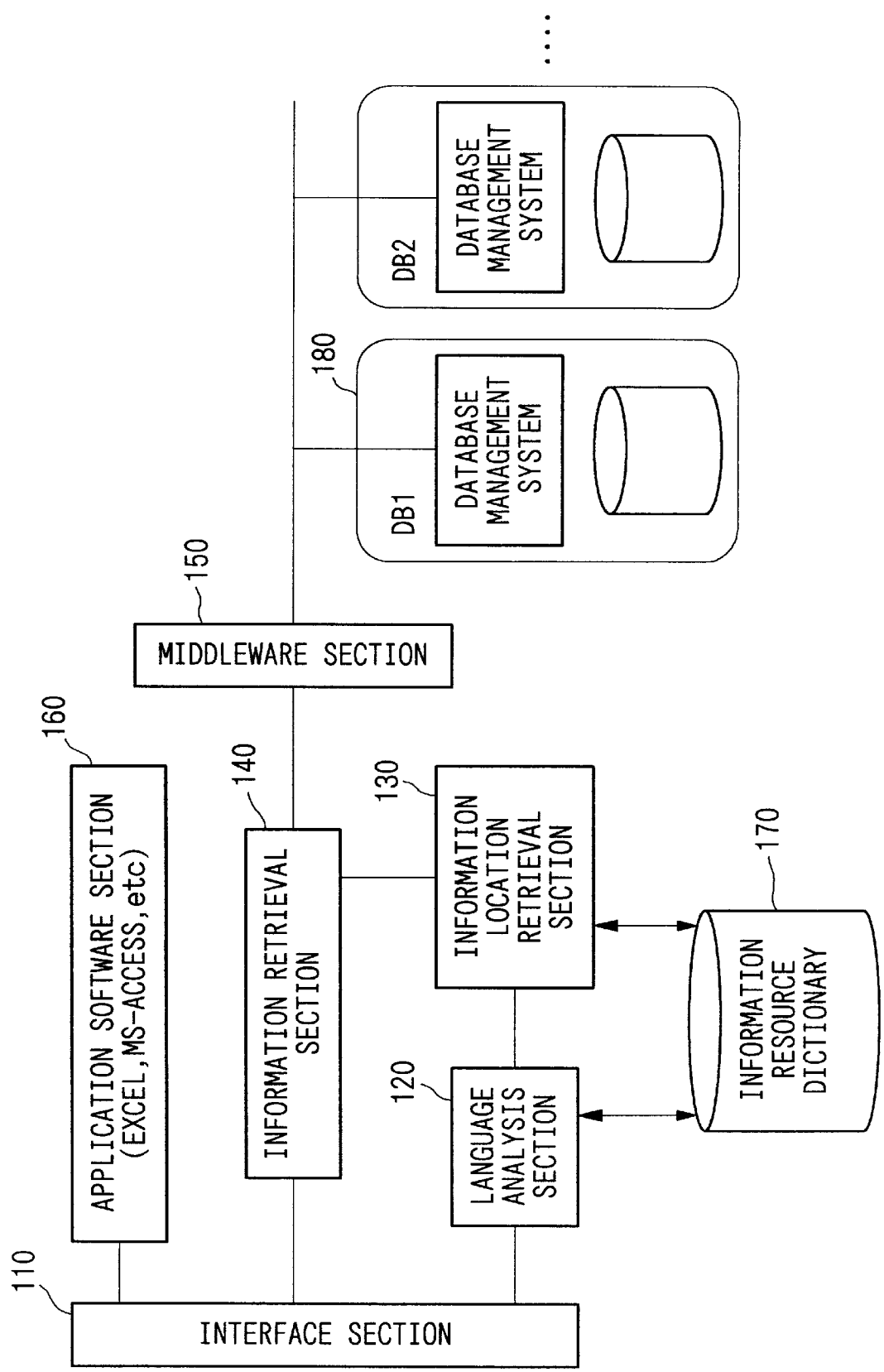
FIG. 3 is a schematic representation of the system configuration of the information retrieval system.

FIG. 3 shows the structure of the information retrieval system.

The retrieval system operates in an environment comprising: an interface section 110; a language analysis section 120; an information location retrieval section 130; an information retrieval section 140; a middlewares section 150; an application softwares section 160; an information resource dictionary 170; and a plurality of different database systems 180.

The interface section 110 serves as the communication interface for the user to enter an information retrieval request.

The language analysis section 120 analyzes the information retrieval request input through the interface section 110. In analyzing the information retrieval request, the retrieval conditions specified by the user and the requested items expressed in the retrieval content are converted into related data items found in different database systems.

Based on the results of the language analysis section 120, the information location retrieval section 130 determines where the requested items can be found in the database systems 180, in consultation with the information resource dictionary 170, acquires the location and method of obtaining the data from relevant database systems 180, and prepares a SQL so that searches can be conducted through the database systems 180. Also, the information location retrieval section 130 obtains necessary information to convert the search results into a format that can be presented to the user and transfers the information to the information retrieval section 140.

The information retrieval section 140 executes the SQL, prepared by the information location retrieval section 130, searches for the data and converts the search results into a format that can be presented to the user.

The information resource dictionary 170 manages a dictionary containing all the meta-information on the database systems connected to the com-network as well as similarity of data items, and acts as the reference resource to the information location retrieval section 130.

The middlewares section 150 is used for accessing the various database systems 180 connected to the com-network. The retrieved results are displayed using commercial application softwares 160.

FIG. 4 shows the structure of the information resource dictionary (IRD)170 containing various Data Item Titles (shortened to Items).

Item 170a of the IRD 170 manages related data items, and groups similar related data items into appropriate groups.

Item 170b manages location information of the databases 180, and in this example, includes the names for the database systems, host names indicating the location of the database systems, and the names for the data base management systems (DBMS) used to manage the databases.

Item 170c manages table information of the databases, and in this example, includes table titles and database titles.

Item 170d manages column information, and in this example, includes column names and data grouping, type, length and table titles.

Item 170e manages information unique to each DBMS, and checks the presence of restrictions for each DBMS.

Item 170f manages display information relating to a display format for the final retrieved results, including a format for expressions, output header information, and delimiter information for displaying a plurality of retrieved results.

FIG. 5 shows a structure of the information retrieval request presented by the information searcher. The information retrieval request is comprised of retrieval content relating to the kind of information required, retrieval conditions relating to the conditions attached to the requested information, and display format relating to the application software being used by the user.

Figure 6:
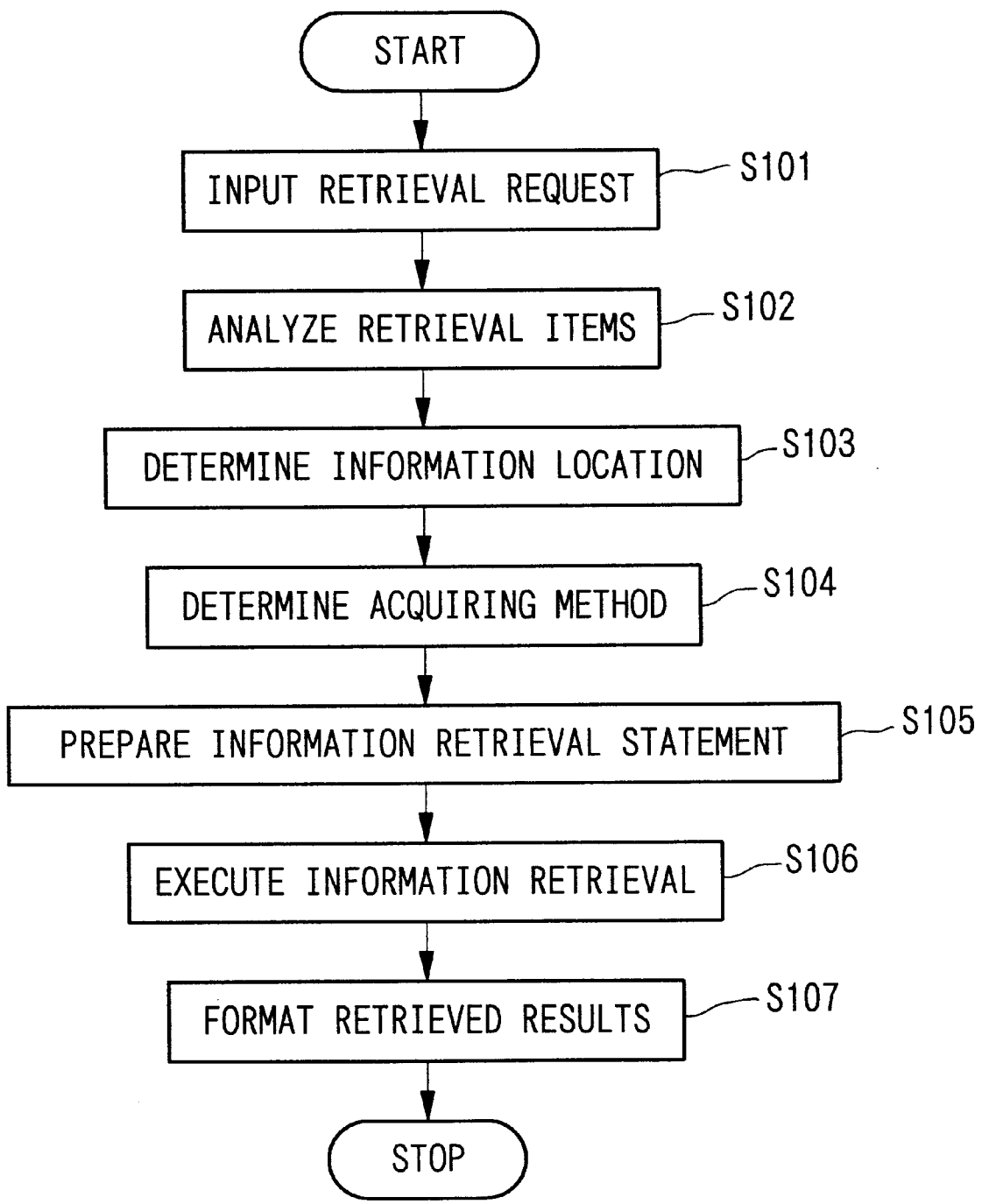
FIG. 6 is a flowchart showing a series of information retrieval steps.

FIG. 6 shows a flowchart for a series of information retrieval steps performed in the present methodology.

In step 101, the user (information searcher) enters an information retrieval request through the interface section 110.

In step 102, the language analysis section 120 analyses the retrieval content, retrieval conditions and display format in the information retrieval request input through the interface section 110. The language analysis section 120 analyses the retrieval content input by the user with reference to Item 170a of the IRD 170, and divides the requested items into groups of related data items of similar meaning to associate the related data items with keywords that the system will recognize.

In step 103, the information location retrieval section 130 determines relevant database systems which satisfy the retrieval content, on the basis of the analysis of the retrieval content performed in step 102, in consultation with Item 170b, 170c and 170d of the IRD 170.

In step 104, the information location retrieval section 130 determines the method for accessing the specified database, on the basis of the analysis of the retrieval conditions performed in step 102, and with reference to Item 170e of the IRD 170.

In step 105, the information location retrieval section 130 prepares a SQL for the requested retrieval content, on the basis of the access location information for the specified databases obtained in step 103 and the retrieval conditions obtained in step 104.

In step 106, information retrieval section 140 performs information retrieval by accessing the specified databases according to the SQL prepared in step 105.

In step 107, the retrieved results 170f are converted into a format specified by the user on the basis of the analysis of the information retrieval request performed in step 102, and are transferred to appropriate application softwares 160 through the interface section 110 to be presented to the user.

The execution of the database system will be explained in more detail with reference to actual examples.

An actual example of the database system 180, comprised of a sumo-wrestler-data system and a personnel-data system, connected to a com-network will be used to illustrate how to obtain specific information concerning sumo-wrestler(s).

To respond to inexact or fuzzy inquiries from the users, various items including related data items are pre-arranged in groups, as shown in FIG. 7, according to their similarities, and are stored under Item 170a of the information resource dictionary (IRD) 170. In the example shown in Item 170a, various related data items or words which might be used by the user, such as "wrestler name", "sumo wrestler", "earned sumo name" and "earned-ranking" are grouped under a group name of "wrestler names" which serves as a keyword. Other examples of related data items, including "born in", "born in city, district, prefecture of", "born in prefecture of", "native of", are grouped under a group name "native of" which is recognized by the system as a keyword.

When the words used by the user in the information retrieval request are not found in the list, a search is conducted directly in the IRD 170 to look for the column(s) containing such a word or words.

Items 170b, 170c and 170d manage information related to database structure. Item 170b contains two database titles "sumo-wrestler files" and "personnel files", and manages the execution programs used in the host names and DBMSs.

Item 170c contains table titles for the databases assigned to Item 170b. The database named "sumo-wrestler files" manages two table titles, "wrestler names" and "boss names".

Item 170d manages the column information contained in the tables assigned to Item 170c. According to the listing of tables shown for Item 170d (FIG. 7), it can be seen that the table name "wrestler" contained in Item 170c includes other column names such as "boss ID", "wrestler name", "age", "birth date", "born in prefecture" and "blood type".

Item 170e manages description rules for executing a retrieval command in each of the DBMSs 180. In the example illustrated, "Oracle7" in Item 170b is shown by """ to indicate that the DBMS name is accessed with double quotation marks while "informix" is shown by """.

Item 170f provides information regarding how to present the retrieved results in the format specified by the user. In the illustrated example, if the expression format "spreadsheet A" is desired, the header is "Content-type: text/excel" and "tab" is used for its delimiter.

In the above example, it is presumed that the database manager had registered the meta-information beforehand, for the database systems connected to the com-network, in the IRD 170 in the format as described under Items 170a~170f.

In the following, the operation of the information retrieval system, having the IRD 170 as described above, will be described for a case of an information retrieval request, shown in FIG. 8, input by a user. The user enters search conditions indicating that he wishes to:

[search for sumo-wrestlers who was born in Tokyo city and display the results in a spreadsheet A format].

The interface section 110 acquires the requested information based on the retrieval conditions and retrieval content specified by the user. In this example, the system indicates to the user that the keywords which have been selected are "wrestler name" based on the retrieval content, and "born in" based on the retrieval conditions.

These keywords are forwarded to the language analysis section 120, and using an item dictionary such as the one shown in Item 170a in the IRD 170, the system finds out that for the keyword "wrestler name", such data items as "sumo-wrestler", "earned sumo name", "earned ranking" which may be found in a database are related terms, and for the keyword "born in", such requested items as "born in", "born in city, district, prefecture of", and "born in prefecture" are related terms also.

In the information location retrieval section 130, these related data items which are included in the "column names" are searched in the IRD 170, and the result is that, as shown in Item 170d, the data items, "wrestler name" and "born in prefecture", are included in the "wrestler" table. Proceeding further, the database name which contains the "wrestler" table is obtained from Item 170c, the location of the database from the Item 170b, the host name for the table as "datapro", and DBMS as "Oracle7".

Further on, by knowing that data is managed by a DBMS in Item 170b, it is found, from the SQL description restriction, that for character specification in Oracle7 requires " " ", double quotation marks as indicated in Item 170e.

The process to this point has established that the relevant table for the retrieval content is to be found in the "wrestler" table, and that the SQL can be prepared by selecting the "wrestler name" including a search condition "born in prefecture="Tokyo"", so that the SQL in FIG. 10 reads:

DB1 (sumo-wrestler files DB); select wrestler name from wrestler where born in prefecture="Tokyo"

The SQL is now forwarded to the middleware section 150 so that the DBMS can execute searches, i.e., the SQL is booted up against the target database system 180. The database system 180 contains the table, shown in FIG. 9, so that searches can be performed in the wrestler table to select a wrestler name "Takanohana" whose born in prefecture is Tokyo.

When the information retrieval section 140 thus receives the search results, they are transferred to the interface section 110, where they are converted to a format to correspond with the input condition for "display format"= spreadsheet A, and are displayed on the user's monitor screen.

Accordingly, the retrieval result shown in FIG. 11 is displayed.

The procedure presented above is acceptable when the information specified in the information retrieval request is found in one common table. However, when the specified information is found in a plurality of tables in a database system or database systems, it is necessary to have some method for relating these tables so that an optimum table grouping can be generated. This is because, the SQL presented above requires not only the location of information but also the method for retrieving the information to be specified.

Figure 12:
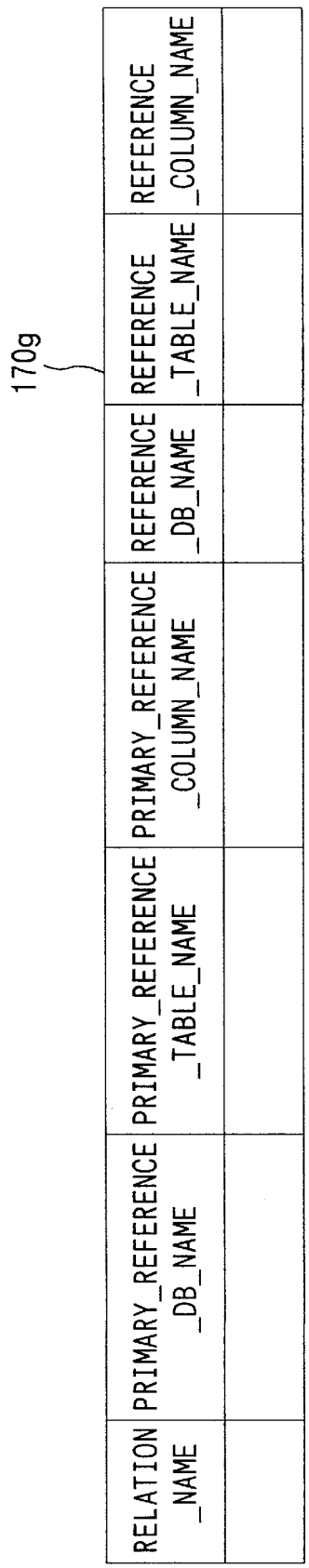
FIG. 12 is a representation of the information resource dictionary with additional items.

Therefore, another Item shown in FIG. 12 must be added to the IRD 170.

Item 170g of the IRD 170 manages information to link different tables, and is comprised of "relation name" for relating the contents of different tables; "primary reference DB" for indicating the database which stores the original table to be related to; "primary reference table" for indicating the original table; "primary reference column" for indicating the column name in the original reference table; "reference DB" for indicating the name of a database containing relevant tables; "reference table" for indicating a related table containing the requested items; and "reference column" for indicating the column name in the related table.

Figure 13:
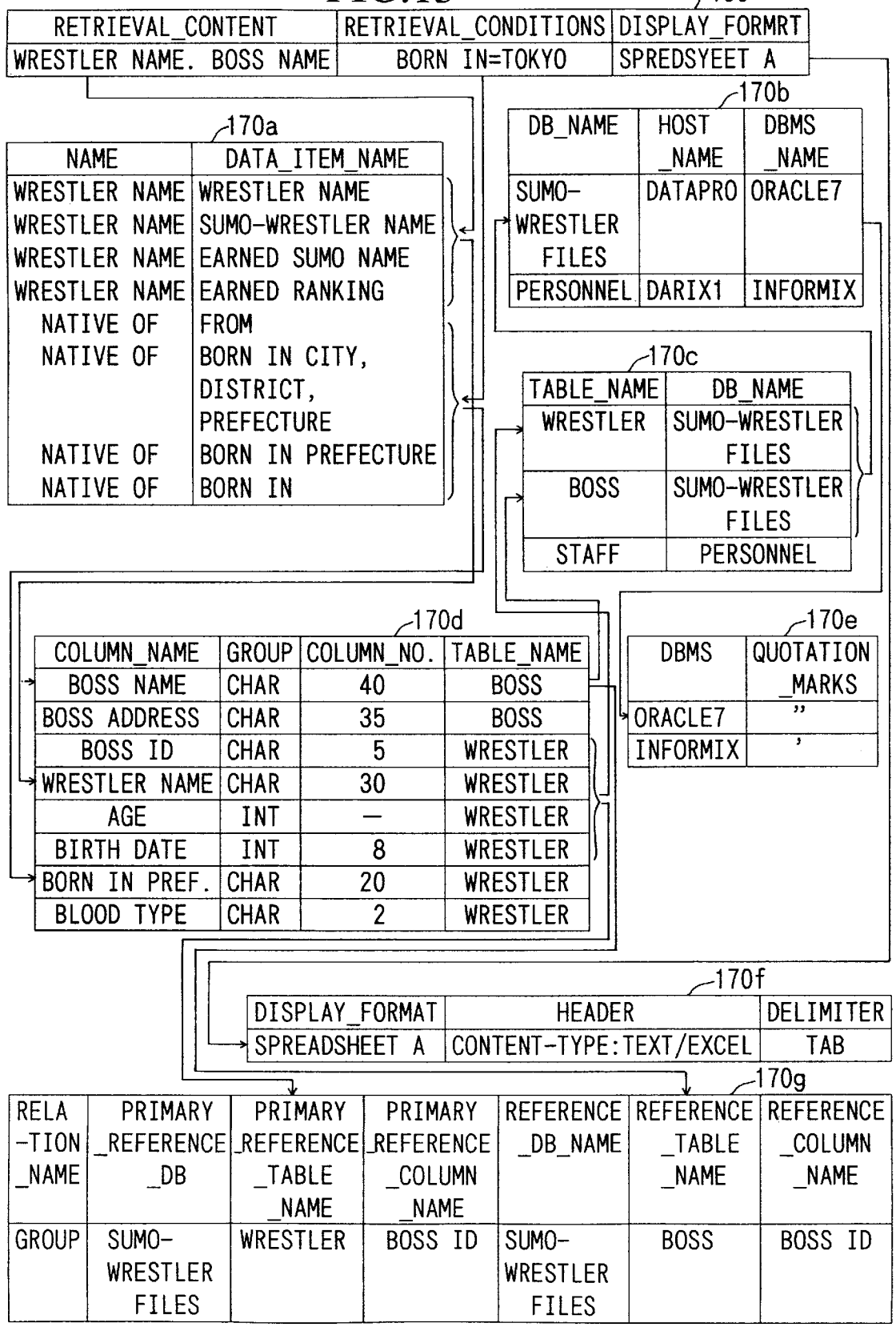
FIG. 13 shows some examples of information retrieval request and information resource dictionary and their interrelationship.

Here, the method of using the related information presented in FIG. 12 will be illustrated with reference to a SQL 190 shown in FIG. 13, i.e. an information retrieval request which reads:

[search for the names for sumo-wrestlers who was born in Tokyo and the names for their bosses, and show the results in a spreadsheet A].

The interface section 110 obtains the information to be retrieved from the retrieval conditions and the retrieval content. The retrieval content indicates that "wrestler name" and "boss name" are keywords, and the retrieval conditions indicate that "born in" is a keyword.

These keywords are forwarded to the language analysis section 120, which performs item analysis on each of the keywords, using an item dictionary similar to the Item 170a in the IRD 170, and obtains information that for the keyword "wrestler name", such data items as "sumo-wrestler", "earned sumo name", "earned ranking" are related terms, and for the keyword "born in", such data items as "born in", "born in city, district, prefecture of", and "born in prefecture" are related terms. It should be noted that "boss name" is not in Item 170*a* meaning that it must be searched for directly in Item 170*d*.

The information location section 130 searches for data items similar to "wrestler name" and "born in" as well as for data term "boss name" which are contained in the "column names" in the IRD 170. The result is that "boss name", "wrestler name" and "born in prefecture" are found within the column names, as indicated in Item 170*d* in FIG. 7.

Here, it should be noted that, from Item 170*d*, the table name containing the column names "wrestler name" and "born in prefecture" is the "wrestler" table, and the table name containing the column name "boss name" is the "boss" table. Therefore, the system now knows that the information specified in the information retrieval request does not exit in the same table, therefore, to execute the information retrieval request, it is necessary to obtain the information from these two tables. This process is performed by extracting the conditions necessary to link the tables by utilizing the related information presented in Item 170*g*.

To extract the conditions for linking the tables, first, the system examines whether there is a column name to relate the wrestler table with the boss table. This is achieved by searching through the reference table titles and primary reference table titles to find a matching set of related data names. If there is information defining a relation between the tables, the primary reference column name and the reference column name are extracted, and are considered to be the conditions for linking the tables.

In this example, the wrestler table and the boss table are related through a relation item "group" and the two tables are related through a column name "boss ID". It may be noted that, in the information retrieval statement (SQL), this search condition is reflected by indicating "wrestler.boss ID=boss.boss ID".

Proceeding on, the database name, "sumo-wrestler files" containing the tables "boss" and "wrestler" is obtained from Item 170*c*, and the host name "datapro is obtained from Item 170*b* as the location of the database and "Oracle7" as its DBMS.

From Item 170*b* containing DBMS name "Oracle7" and information regarding the description restriction for SQL, shown in Item 170*e*, are obtained.

The process to this point has established that the retrieval content relates to search tables "wrestler" and "boss" tables, and "wrestler name, boss name" should be searched under the search conditions "born in prefecture="Tokyo" and wrestler.boss ID=boss.boss ID". This information is forwarded to the information retrieval section 140 which prepares a SQL to read:

DB1 (sumo-wrestler files DB); select wrestler name, boss name from wrestler, boss, where born in prefecture=Tokyo and wrestler.boss ID=boss.boss ID The SQL is now forwarded to the middleware section 150 so that the DBMSs can execute searches, and the boss table and the wrestler table, such as those shown in FIG. 9, are retrieved. The results show the wrestler name "Takanohana" from the wrestler table, and "Futagoyama" from the boss table.

The retrieved results are converted into a format to correspond with the input condition for "display format"= spreadsheet A, that is, in a format which can be read by the application software of the user, and are displayed on the user's monitor screen through the application software.

It should be noted that, in the examples presented, those programs for executing the request analysis means 20; storage location information retrieval means 30; method retrieval means 35; information retrieval means 140; retrieval information presentation means 10 shown in FIG. 2 as well as other programs for executing various processing sections shown in FIG. 3 can be recorded on a recording medium that can be read into a computer, which is used to conduct information retrieval from a plurality of different databases connected to a com-network.

It is obvious that the foregoing examples are meant to be illustrative, and do not restrict in any way the applicability of the method and the system. The principles is that results of information retrieval can be made more comprehensive by having own programs within the system to understand how to use various DBMSs connected to a network, can be modified to suit a wide variety of information retrieval applications within the range of claims presented in the following.

What is claimed is:

1. A method for retrieving requested information from different database systems connected to a communication network, by retrieving information to satisfy an information retrieval request, wherein:

the information retrieval request is constructed by a retrieval item that an information searcher wants to retrieve and a retrieval condition related to the retrieval item; and wherein the method comprises the steps of storing an information resource dictionary beforehand, in which an information of relationship between retrieval items and data items, the data items which are column names in each database and tables in each database, and items of the tables and the each database are contained;

determining data items based on the retrieval item and the retrieval condition in the information retrieval request when receiving said information retrieval request;

determining a database system to be searched by retrieving the information resource dictionary using the determined data items;

generating an information retrieval statement which is a structured query language having a peculiar style of the determined database system;

searching through said database system based on the information retrieval statement; and presenting retrieved information to the information searcher.

2. A method according to claim 1, wherein:

the information resource dictionary further contains an information which shows correspondence of relationship of tables in each database, to a location and a database management system of each database; and the information retrieval statement is generated using the information related to the location and the database management system of the determined database system.

3. A method according to claim 2, wherein:

said information resource dictionary further contains an information related to a restriction of description of each database management system; and the information retrieval statement is generated by preparing a structured query language corresponding to the determined database system using the information related to the restriction of description of the database management system of the determined database system.

4. An information retrieval system comprising:

a processor which retrieves requested information from different database systems connected to a communication network, by retrieving information to satisfy an information retrieval request, wherein the information retrieval request is constructed by a retrieval item that an information searcher wants to retrieve and a retrieved condition related to the retrieval item;

a storage device which stores an information resource dictionary in which an information of relationship between retrieval items and data items, the data items which are column names in each database and tables in each database, and the table and the each database are contained; and wherein the processor performs the functions of:
  determining data items based on the retrieval item and the retrieval condition in the information retrieval request when receiving said information retrieval request;
  determining a database system to be searched by retrieving the information resource dictionary using the determined data items;
  generating an information retrieval statement which is a structured query language having a peculiar style of the determined database system;
  searching through said database system; and
  presenting retrieved information to the information searcher.

5. A method according to claim 4, wherein:
  the information resource dictionary further contains an information which shows correspondence of tables, which are connected by the retrieval item in each database, to a location and a database management system of each database; and
  in the function of generating the information retrieval statement using the information related to the location and the database management system of the determined database system.

6. An information retrieval system according to claim 5, wherein:
  said information resource dictionary further contains an information related to a restriction of description of each database management system; and
  in the function of generating an information retrieval statement, the processor performs the function of generating the information retrieval statement by preparing a structured query language corresponding to the determined database system using the information related to the restriction of description of the database management system of the determined database system.

7. A recording medium, readable by computer means, having information resource dictionary data recorded for use in retrieving information from a plurality of different database systems connected to a communication network, by generating an information retrieval request containing requested items; wherein,
  said information resource dictionary data are recorded in: a related data items file for managing similar data items; a column information file for managing column names which are the data items contained in each table; a table information file for managing tables contained in each database; a database information file for managing locations of each database; and a database management system file, known as a DBMS file, for managing dedicated information for methods of acquiring requested items from each database; and wherein
  said related data items file has an allocation for recording retrieval items, which are items an items an information searcher wants to retrieve, in relation to similar data items;
  said column information file has an allocation for recording column names contained in tables in relation to table titles so as to relate column names to requested items specified in said information retrieval request, and when the retrieval items are not contained in the related data items file, said column information file is retrieved using the retrieval items as column names;
  said table information file has an allocation for recording table titles contained in databases in relation to database titles so as to relate said column information file to said table information file through table titles;
  said database information file has an allocation, for each of databases connected to said communication network, for recording database titles, host names indicating locations of databases and DBMS names for each database being managed by a DBMS, so as to relate said table information file and said database information file through database titles; and
  said dedicated DBMS file has an allocation, for each of DBMSs, for recording DBMS names in relation to dedicated information for each DBMS, so as to relate said database information file and said dedicated DBMS file through database titles.

8. A recording medium, readable by computer means, having information resource dictionary data recorded for use in retrieving information from a plurality of different database systems connected to a communication network, by generating an information retrieval request containing requested items; wherein,
  said information resource dictionary data are recorded in: a related data items file for managing similar requested items in groups; a column information file for managing requested items located in columns comprising tables; a relation information file for managing column names for linking tables; a table information file for managing tables contained in each database; a database information file for managing locations of each database; a database management system file, known as a DBMS file, for managing dedicated information for methods of acquiring requested items from databases; and a results display file for managing display methods for retrieved results; wherein
  said related data items file has an allocation for recording retrieval items, which are items an information searcher wants to retrieve, in relation to groups of similar data items;
  said column information file has an allocation for recording column names comprising tables in relation to table titles so as to relate said related data items file to said column information file through related data items in said related data items file and columns in said column information file, and when the retrieval items are not contained in the related data items file, said column information file is retrieved using the retrieval items as column names;
  said relation information file has an allocation for recording each table name in relation to column names, in order to manage column names which link relevant tables, so as to relate said column information file to said relation information file through table titles;
  said table information file has an allocation for recording table titles contained in databases in relation to database titles so as to relate said column information file to said table information file through table titles;
  said database information file has an allocation, for each of databases connected to said communication network, for recording database titles, host names indicating locations of databases and DBMS names for each database being managed by a DBMS, so as to relate said table information file and said database information file through database titles; and said dedicated DBMS file has an allocation, for each of DBMSs, for recording DBMS names in relation to dedicated information for each DBMS, so as to relate said database information file and said dedicated DBMS file through database titles; and said results display file has an allocation for recording application software information in relation to format information for reading said application softwares, and said application software information includes an application software being used in said information retrieval request.

9. A computer program product containing a computer readable program for causing a computer to retrieve requested information from different database systems connected to a communication network, by retrieving information to satisfy an information retrieval request, wherein:

the information retrieval request is constructed by a retrieval item that an information searcher wants to retrieve and a retrieval condition related to the retrieval item;

the computer stores an information resource dictionary beforehand, in which an information of relationship between retrieval items and data items, the data items which are column names in each database and tables in each database, and the tables and the each database are contained; and wherein the computer program effects the process of:
determining data items based on the retrieval item and the retrieval condition in the information retrieval request when receiving said information retrieval request;
determining a database system to be searched by retrieving the information resource dictionary using the determined data items;
generating an information retrieval statement which is a structured query language having a peculiar style of the determined database system;
searching through said database system; and
presenting retrieved information to the information searcher.

10. A computer program product according to claim 9, wherein:

the information resource dictionary further contains an information which shows correspondence of relationship of tables, which are connected by the retrieval item in each database, to a location and a database management system of each database; and in the process of generating an information retrieval statement, the computer program effects the process of generating the information retrieval statement using the information related to the location and the database management system of the determined database system.

11. A computer program product according to claim 10, wherein:

said information resource dictionary further contains an information related to a restriction of description of each database management system; and in the process of generating an information retrieval statement, the computer program effects the process of generating the information retrieval statement by preparing a structure query language corresponding to the determined database system using the information related to the restriction of description of the database management system of the determined database system.

* * * * *